United States Patent
Joergensen

(10) Patent No.: US 7,072,589 B2
(45) Date of Patent: *Jul. 4, 2006

(54) METHOD AND APPARATUS FOR CONTROLLING THE POWER LEVEL IN AN OPTICAL REGENERATOR

(75) Inventor: Carsten Gudmann Joergensen, Roskilde (DK)

(73) Assignee: Fitel USA Corp., Norcross, GA (US)

( * ) Notice: Subject to any disclaimer, the term of this patent is extended or adjusted under 35 U.S.C. 154(b) by 627 days.

This patent is subject to a terminal disclaimer.

(21) Appl. No.: 10/246,206

(22) Filed: Sep. 16, 2002

(65) Prior Publication Data

US 2004/0052534 A1   Mar. 18, 2004

(51) Int. Cl.
*H04B 10/02* (2006.01)
(52) U.S. Cl. ....................... 398/175; 398/180
(58) Field of Classification Search ........... 398/173, 398/175, 176, 180
See application file for complete search history.

(56) References Cited

U.S. PATENT DOCUMENTS

| | | | |
|---|---|---|---|
| 6,141,129 A | 10/2000 | Mamyshev | 398/180 |
| 6,587,242 B1* | 7/2003 | Shake et al. | 398/98 |
| 2004/0208609 A1* | 10/2004 | Eggleton et al. | 398/147 |

* cited by examiner

*Primary Examiner*—Christina Y. Leung
(74) *Attorney, Agent, or Firm*—Sutherland Asbill & Brennan LLP

(57) ABSTRACT

An optical regenerator enabling matching of self-phase modulation induced spectral broadening and optical regenerator filter center wavelengths and bandwidths for different fiber dispersion values. The regenerator monitors the central part of an input signal spectrum at the output of a non-linear medium and suppresses the power at the center wavelength to allow for a constant spectral broadening for different fiber dispersion values. The regenerator utilizes a control filter to control a variable amplifier via a feedback loop, and the variable amplifier adjusts the power of the signal launched into the non-linear medium to ensure a sufficient self-phase modulation broadened spectrum.

20 Claims, 4 Drawing Sheets

METHOD AND APPARATUS FOR CONTROLLING THE POWER LEVEL IN AN OPTICAL REGENERATOR

FIELD OF THE INVENTION

The present invention generally relates to optical data regeneration, and more particularly, to optimizing the performance of optical regenerators by adjusting the launch power of an optical regenerator.

BACKGROUND OF THE INVENTION

Communications and data transmission systems that transmit information signals in the form of optical pulses over a dielectric waveguide such as an optical fiber are now commonplace, and optical fiber systems have become the physical transport medium of choice in long distance telephone and data communication networks. While improvements in the sources of the optical pulses and in the optical fiber waveguides have increased the range over which such signals can be transmitted to between 100 and 200 kilometers, a problem with optical fiber systems is that whenever a digital optical data signal is generated, transmitted, switched, multiplexed, demultiplexed, or otherwise processed, the signal invariably is subject to some degree of distortion. Distortion is typically cumulative and if the original signal is not periodically restored, data can become riddled with errors or become completely incomprehensible.

Optical data regenerators are utilized to periodically restore the quality of an original data signal. Once a signal (e.g., comprising bits of ones and zeros) has propagated through some distance of an optical fiber, it loses power and occasionally must be re-amplified. However, each time the signal is amplified noise is added, and the signal to noise ratio is constantly reduced as the signal propagates through the fiber. The role of regenerators, which are situated at locations along the signals' transmission, is to restore the original information content and improve optical signal noise reduction by reducing amplitude fluctuations of the signal as it existed when launched into the optical fiber. Thus, once a signal is detected and analyzed, a copy of the signal can be re-launched, thereby ensuring that a clean, undistorted signal continues in the transmission path.

U.S. Pat. No. 6,141,129, to Mamyshev (the 'Mamyshev patent'), describes a method and apparatus for all-optical regeneration of return-to-zero (RZ) data streams through the use of self-phase modulation (SPM) of a data signal which passes through a non-linear medium (NLM). Essentially, the Mamyshev patent discloses a method and apparatus which enhances the power level of a propagated optical signal and then passes the signal through an NLM to create spectral broadening which is subsequently utilized by a filter to reduce amplitude fluctuations (noise) and to regenerate the originally transmitted signal.

More specifically, the invention disclosed in the Mamyshev patent performs regeneration by utilizing a nonlinear effect, where the output of the regenerator varies or differs depending on the power of the signal that was incident (received) at the regenerator. An NLM causes spectral broadening in individual data pulses which are then filtered to pass a selected bandwidth centered at a frequency $\omega_f$ shifted with respect to the input data carrier frequency $\omega_0$. Generally, the higher the input power of a signal, the further new frequencies due to spectral broadening will be from the input signal carrier $\omega_0$, and to some extent, saturation will occur. The new spectral components are created by the physics of the NLM, and are created by a process of self-phase modulation (SPM). Thus, if a 1 bit is launched into the NLM, a large spectral broadening will result, whereas small spectral broadening will result if a 0 bit is launched into the NLM. In the method and apparatus of Mamyshev, noise in null values (data 'zeros') possess insufficient intensity to cause the requisite amount of spectral broadening to encompass the selected filter bandwidth centered around $\omega_f$, and the noise is suppressed. On the other hand, noise or amplitude fluctuations in set values (data 'ones') possess sufficient intensity to cause the requisite spectral broadening to encompass the selected filtered bandwidth centered around $\omega_f$, and that portion of the spectrally broadened pulse contained within the bandwidth centered around $\omega_f$ is subsequently passed.

As noted above, the SPM induced spectral broadening in the optical fiber depends on the optical power launched into the fiber. For a given launch power, the spectral broadening also depends on the fiber dispersion (see, e.g., G. P. Agrawal, "Nonlinear fiber optics", Academic Press, Inc, 1989, pp. 75–94). The optical regenerator of Mamyshev works best with a small normal dispersion between −0.25 and −0.75 ps/nm/km. However, in this range of dispersion, a fixed launch power may not result in the same spectral broadening for different fiber dispersion values due to the inability to effectively produce fiber with exact and highly fine tolerances. Therefore, the performance of the optical regenerator is not optimized and can result in inaccurate signal regeneration.

Therefore, what is needed is a method and apparatus for optical regeneration that will allow a range of fiber dispersion values while simultaneously resulting in the same or similar spectral broadening, thus maximizing the effectiveness of an optical signal regenerator.

BRIEF SUMMARY OF THE INVENTION

The present invention is directed to methods and apparatuses which optimize the performance of optical regenerators through adjustments to the launch power of an optical regenerator via a feedback loop. The feedback loop allows for the matching of self-phase modulation induced spectral broadening and optical regenerator filter center wavelengths and bandwidths for different fiber dispersion values. Because the same spectral broadening and almost the same peak frequency variation is obtainable for different fiber dispersion values if the launch power is appropriately adjusted, the present invention monitors the central part of the input spectrum at the output of the NLM in the optical regenerator and suppresses the line component positioned at the input center wavelength to identify similar spectral broadening for different fiber dispersion values.

According to one embodiment of the invention, there is disclosed an optical signal regenerator. The optical signal regenerator includes a variable optical amplifier, operable to accept an optical data stream, having an input carrier frequency, from a transmission medium and to amplify the optical data stream. The regenerator also includes a nonlinear medium (NLM) having an NLM inlet operable to accept the amplified optical data stream, where the NLM utilizes the effect of self-phase modulation (SPM) to induce a signal spectral bandwidth broadening in the amplified optical data stream. The regenerator further includes a bandpass filter (BPF) coupled to the NLM and having a center frequency and a bandwidth, where the bandwidth passes frequencies other than the input carrier frequency, and a control filter coupled to the NLM, where the control filter has a bandwidth that passes frequencies including the input carrier frequency. The control filter also includes an outlet coupled to the variable optical amplifier to adjust the amplification of the variable optical amplifier.

According to one aspect of the invention, the NLM includes optical fiber. According to another aspect of the invention, the control filter is operable to adjust the amplification of the variable optical amplifier such that the power of the amplified optical data stream at the input carrier frequency is minimized. According to yet another aspect of the invention, the variable optical amplifier is operable to amplify the optical data stream to a level sufficiently high enough to encompass frequencies included within the transmission band of the BPF.

According to a further aspect of the invention, the BPF includes an outlet providing a regenerated version of the optical data stream. Additionally, the control filter can include a bandpass filter having a center frequency within 10 gigahertz of the input carrier frequency. Furthermore, according to the invention, the control filter may be operable to examine the central line component of the amplified, spectrally broadened signal received from the NLM.

According to yet another aspect of the invention, the optical signal regenerator can further include a power meter, coupled to the control filter and to the variable optical amplifier, where the power meter determines the average power of the amplified optical signal passed by the control filter. The power meter may also, according to one aspect of the invention, determine an average power of a central line component of the amplified, spectrally broadened signal received from the NLM. Additionally, the optical signal regenerator of the present invention may include a comparator, coupled to the power meter and to the variable optical amplifier, where the comparator compares the average power to a threshold to determine whether the amplification power of the variable optical amplifier should be adjusted.

According to another embodiment of the invention, there is disclosed a method for optical signal regeneration. The method includes amplifying a data stream through a variable amplifier, where the data stream includes an input carrier frequency, transmitting the amplified data stream through a nonlinear medium (NLM) having an NLM inlet operable to accept the amplified data stream, where the NLM induces a signal spectral bandwidth broadening in the amplified data stream using self-phase modulation (SPM), and filtering the amplified, spectrally broadened data stream through a bandpass filter (BPF) having a center frequency and a bandwidth, where the bandwidth passes frequencies other than the input carrier frequency. The method further includes filtering the amplified, spectrally broadened data stream through a control filter coupled to the NLM, where the control filter has a bandwidth that passes frequencies including the input carrier frequency, and adjusting the amplification of the variable amplifier based on an output of the control filter.

According to one aspect of the invention, transmitting the amplified data stream through a nonlinear medium includes transmitting the amplified data stream through an optical fiber. According to another aspect of the invention, adjusting the amplification of the variable amplifier further includes adjusting the amplification of the variable amplifier such that the power of the amplified, spectrally broadened data stream at the input carrier frequency is minimized. According to yet another aspect of the invention, adjusting the amplification of the variable amplifier based on an output of the control filter includes adjusting the variable amplifier such that the data stream is amplified to a level sufficiently high enough to encompass frequencies included within the transmission band of the BPF.

The method of the present invention can further include the step of providing a regenerated version of the data stream from an outlet of the BPF. Additionally, filtering the amplified, spectrally broadened data stream through a control filter can include filtering the amplified, spectrally broadened data stream through a control filter including a bandpass filter having a center frequency within 10 gigahertz of the input carrier frequency.

According to another aspect of the present invention, the method further includes examining the central line component of the amplified, spectrally broadened data stream received from the NLM. Moreover, the method may include determining, at a power meter couple to the control filter, the average power of the amplified, spectrally broadened data stream passed by the control filter. The average power of a central line component of the spectrally broadened data stream received from the NLM can also be determined by the present invention. According to yet another aspect of the invention, the method can compare the average power to a threshold to determine whether the amplification power of the variable amplifier should be adjusted.

BRIEF DESCRIPTION OF THE SEVERAL VIEWS OF THE DRAWINGS

Figure 1:
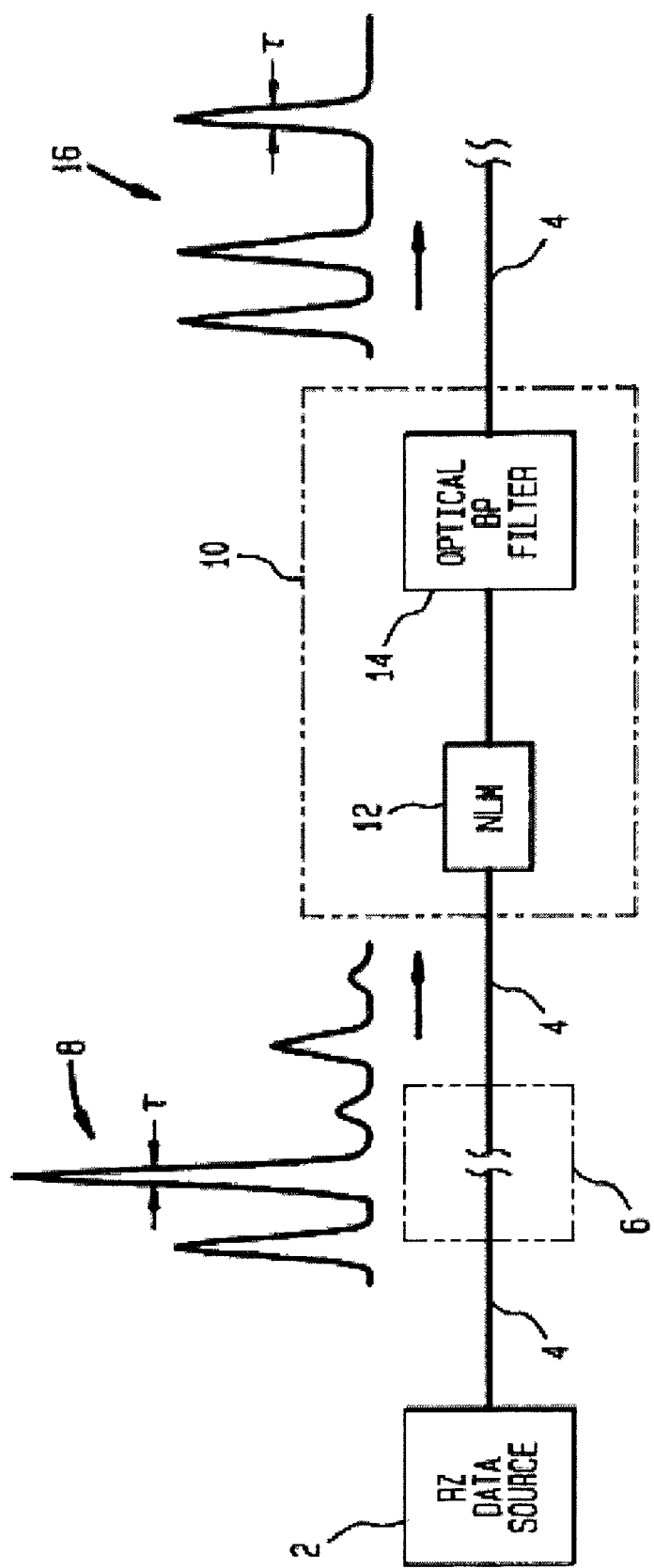

Having thus described the invention in general terms, reference will now be made to the accompanying drawings, which are not necessarily drawn to scale, and wherein:

FIG. 1 shows in block-diagram form an exemplary all-optical signal regenerator illustrating typical signal distortion at the regenerator input and a regenerated signal output from the regenerator, according to the prior art.

Figure 2:
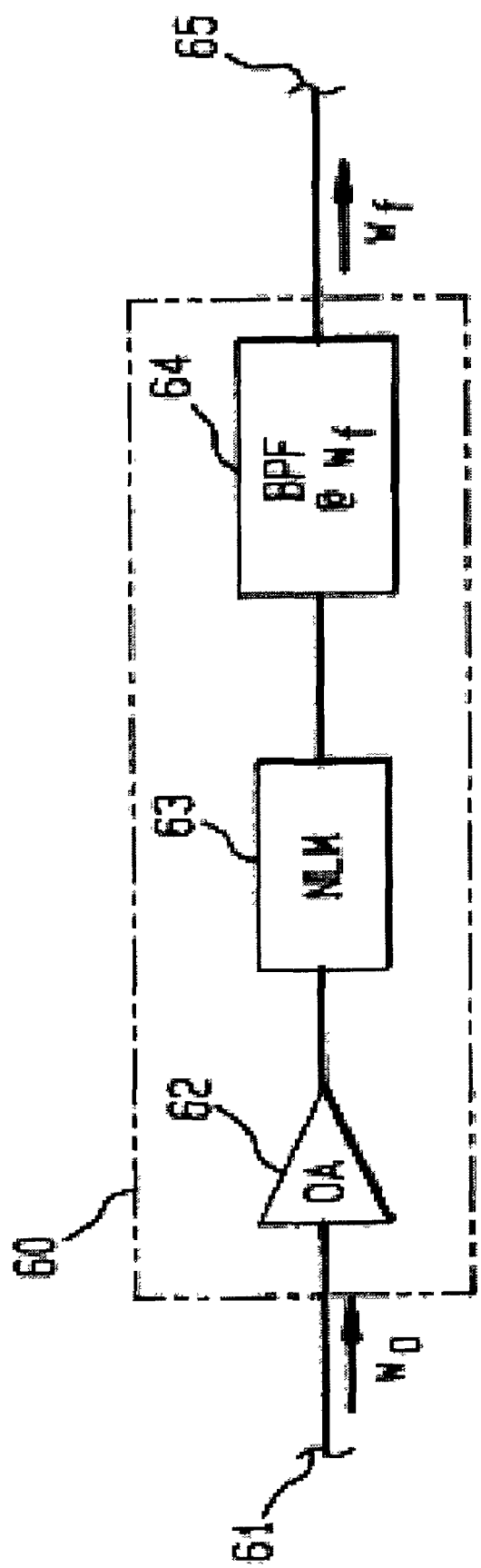

FIG. 2 shows in block-diagram form an exemplary embodiment of an all-optical signal regenerator which incorporates an optical amplifier, according to the prior art.

Figure 3:
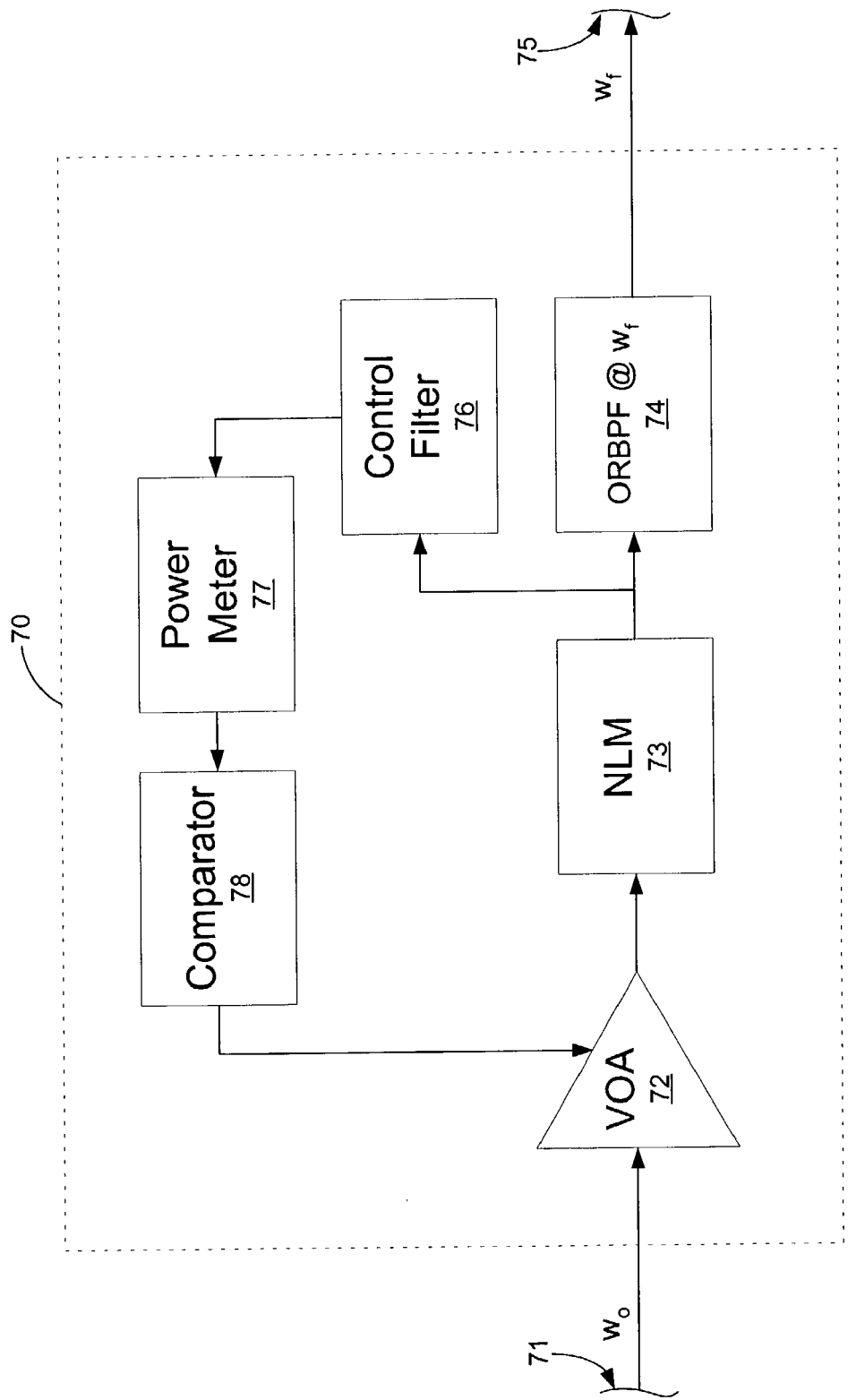

FIG. 3 shows in block-diagram form an all-optical signal regenerator incorporating a monitor which examines the central portion of an input spectrum at the output of an NLM, according to one embodiment of the present invention.

Figure 4:
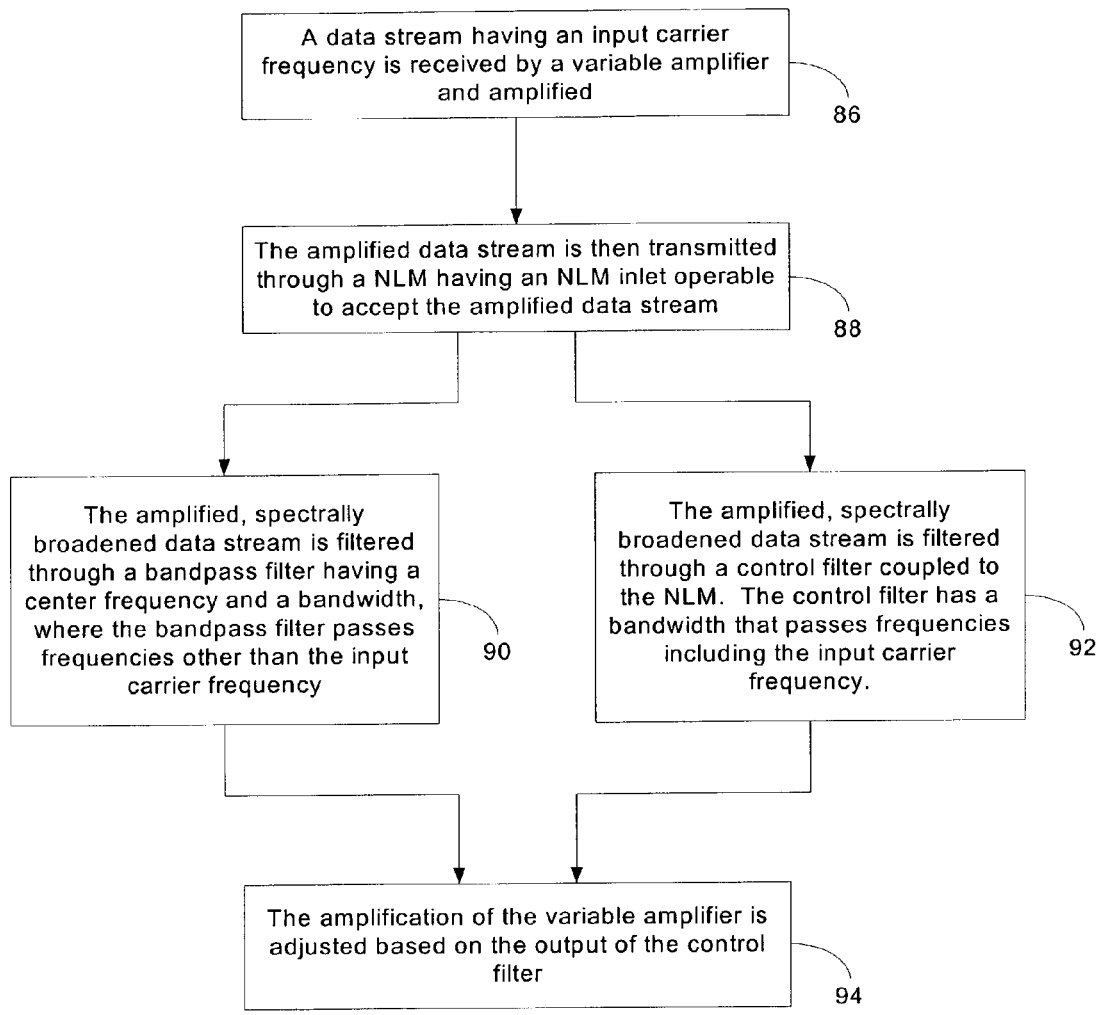

FIG. 4 shows in block-diagram form a method implemented by the all-optical signal regenerator of FIG. 3, according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 is a diagram of an exemplary all-optical signal regenerator 10, in accordance with the prior art. The all-optical signal regenerator 10 suppresses the noise from signal "zeros" and minimizes variations in amplitude from signal "ones" for return-to-zero (RZ) data streams. Therefore, a signal transmitting source 2 is shown as an RZ data source. The signal transmitting source 2 transmits an optical data stream over a transmission medium 4. The transmission medium 4 is typically an optical fiber medium, however, it will be apparent to those of skill in the art that any optical transmission medium may be used. Along the transmission medium 4, there are one or more system distortion sources 6, including the transmission medium, switches, couplings, multiplexers, demultiplexers, or any other device known to those skilled in the art to cause signal degradation. Distortion of the signal transmitted from the source 2 is represented by an input signal 8 to an all-optical regenerator 10. Briefly, the all-optical regenerator 10 produces an output signal 16 with noise suppressed and the variations in amplitude of signal "ones" minimized. The all-optical regenerator 10 is comprised of a minimum of two components, including a nonlinear medium (NLM) 12, such as a highly non-linear fiber (HNLF), and an optical regenerator band pass filter (ORBPF) 14.

The choice of band pass frequency for the ORBPF 14 with respect to the selection of the NLM 12 utilized is crucial to the operation of the regenerator 10. The optical regenerator 10 utilizes the effect of self-phase modulation (SPM) of the data signal in the NLM 12 with subsequent optical filtering at a frequency ($\omega_f$) that is shifted with respect to the input data carrier frequency ($\omega_0$). Signal output pulses are essentially transform-limited and the resultant transfer function (i.e., output pulse intensity versus input pulse intensity) is essentially a limiter function. It should be noted that SPM of the data signal can occur within an optical fiber (which may encompass the transmission medium 4 in whole or part) or any other nonlinear material, including NLM 12, as would be apparent to those skilled in the art.

Utilizing the effect of self-phase modulation accomplishes signal regeneration in the following manner. Input signal 8 pulses possess a spectral bandwidth of $\Delta\omega_0$, which is approximately equal to the quantity associated with inverse pulsewidth (i.e., $\Delta\omega_0 \sim 1/\tau$, where $\tau$ is input signal pulsewidth). Due to the effect of SPM, the spectral bandwidth of the pulses broadens as they are conveyed over the nonlinear medium (NLM) 12. The equation describing the broadened signal bandwidth as a result of self-phase modulation (SPM) is $$\Delta\omega_{SPM} = \Delta\omega_0 \frac{2\pi}{\lambda} n_2 I_p L \qquad [1]$$

where $I_p$ is the input signal 8 pulse intensity (which may vary from pulse to pulse for a given input signal 8 due to previously introduced distortion), $n_2$ is the nonlinear refractive index, $\lambda$ is input signal 8 wavelength, L is the effective length of the nonlinear medium 12, $\Delta\omega_{SPM}$ is the spectral bandwidth of the broadened signal as a result of SPM, $\omega_0$ is the center carrier frequency of the input signal 8, and $\Delta\omega_0$ is the bandwidth of the input signal 8.

After transport through the nonlinear medium (NLM) 12, the pulses pass through the ORBPF 14. The center frequency of the ORBPF 14, $\omega_f$, is selected at a frequency other than the input signal carrier frequency, $\omega_0$; the relationship between the ORBPF frequency, input signal carrier frequency, and the relative frequency shift ($\omega_{shift}$) between the two is described by the equation $$\omega_f = \omega_0 + \Delta\omega_{shift} \qquad [2]$$

If the spectral broadening described in equation [1] is small enough for a particular pulse, that is when, $$\frac{\Delta\omega_{SPM}}{2} < \Delta\omega_{shift} \qquad [3]$$

then the pulse is rejected as noise by the optical regenerator band pass filter 14 and will not be passed on. This occurs because according to equation [1], the self-phase modulation bandwidth is proportional to input signal pulse intensity, $I_p$; therefore, the greater the pulse intensity, the greater spectral broadening associated with a pulse as it propagates through the NLM 12. Those pulses conforming to the constriction of equation [3], therefore have an input signal pulse intensity too small to be a data "one" (set value) and are regenerated as a data "zero" (null value), because the spectral broadening imposed upon the pulse as it transits the NLM 12 is insufficient to extend into the frequency region being passed by the optical regenerator band pass filter 14. The relationship between $\Delta\omega_{SPM}$ and $\Delta\omega_{shift}$ is fixed, as can be discerned in equation [3]. Since $\Delta\omega_{SPM}$ represents the entire spectral bandwidth of the broadened pulse, half that amount represents the required spectral bandwidth for $\Delta\omega_{shift}$, since a shift may occur on either side of the center frequency associated with the self-phase modulation bandwidth.

If the input signal pulse intensity, $I_p$, is great enough so that $$\frac{\Delta\omega_{SPM}}{2} \geq \Delta\omega_{shift} \qquad [4]$$

then a portion of the SPM broadened spectrum passes through the optical regenerator band pass filter. The spectral bandwidth of the filtered pulse is determined by the filter spectral bandwidth, $\Delta\omega_f$. For a wide range of parameters, the filtered pulse is essentially a transform-limited pulse in the time domain. By selectively choosing the filter spectral bandwidth, $\Delta\omega_f$, an appropriate adjustment in the output pulsewidth is concomitantly made. Therefore, preservation of the value of an original pulsewidth ($\Delta\omega_0 \sim \Delta\omega_f$), if desired, is maintained via the selection of the filter spectral bandwidth. The intensity of the output filtered pulse is proportional to the spectral density of the SPM-broadened spectrum at the output of the nonlinear medium 12, $I_p = dI/d\omega$. From equation [1], it can be estimated that $$I_\omega \sim I_p / \Delta\omega_{SPM} = \frac{\lambda}{\Delta\omega_0 2\pi n_2 L} \qquad [5]$$

Therefore, $I_\omega$, and consequently the intensity of the regenerator output pulse, are independent of the input pulse intensity ($I_p$), if the magnitude of $I_p$ is great enough to meet the condition of equation [4]. As a result, a pulse transfer function is established, which relates the pulse intensity of an input signal 8 to the pulse intensity of an output signal 16, so that:

$$I_{out} = 0, \text{ if } I_p < I_{CR} \qquad [6a]$$

$$I_{out} = \text{const}, \text{ if } I_p > I_{CR} \qquad [6b]$$

where the critical pulse intensity, $I_{CR}$, is determined from $\Delta\omega_{SPM}/2 = \Delta\omega_{shift}$:

$$I_{CR} = \frac{2\Delta\omega_{shift}}{\Delta\omega_0 \frac{2\pi}{\lambda} n_2 L} \quad [7]$$

The transfer function of equation [6] is an ideal transfer function for a regenerator because intensity distortions manifested as noise in "zeros" are removed [6a], and intensity distortions manifested as amplitude jitter in "ones" are suppressed [6b]. An exemplary embodiment of the prior art optical regenerator described above utilizing numerical values is not discussed herein, but for further discussion see, e.g., U.S. Pat. No. 6,141,129, the entire contents of which are incorporated herein.

FIG. 2 is a diagram of an exemplary embodiment of an all-optical signal regenerator 60 incorporating an optical amplifier, according to the prior art. The regenerator signal inlet port 61 is coupled to receive an RZ optical data stream from a transmission medium. The regenerator signal inlet port 61 is coupled to the inlet of an optical amplifier 62 and the outlet of the optical amplifier 62 is coupled to of the inlet of an NLM 63. The outlet of the NLM 63 is coupled to the inlet of an ORBPF 64 with a center frequency of ($\omega_f$). The output of the ORBPF 64 is then coupled to a regenerator signal outlet port 65.

The regenerator signal inlet port 61 receives a RZ optical data stream, at an input signal carrier frequency ($\omega_0$), from the transmission medium. The optical amplifier 62 amplifies the input signal data stream so that input signal pulse intensity is sufficient to create adequate SPM induced spectrum broadening when transported within a nonlinear material. Although the ORBPF 64 typically results in a large power loss, it is of no consequence due to the fact that very high powered signals are preferably launched into the NLM 63. For instance, transmissions launched into an optical fiber typically range around 1 milliwatt, whereas 100 to 200 times higher power is preferred for the NLM 63. The NLM 63, over which the data stream is transmitted, produces an SPM-broadened spectrum, centered around $\omega_0$, which is then subjected to the ORBPF 64 with center frequency ($\omega_f$). The output of the BPF is coupled to the regenerator signal outlet port 65.

Optical regenerators, like that described in FIGS. 1 and 2, not only generate new frequency components through self-phase modulation, but also distort the pulse propagating through the regenerator due to a small amount of dispersion in the NLM (hereafter NLM and non-linear fiber are used interchangeably; however, a non-linear fiber is only one type of NLM, and this is not intended to limit the invention to a non-linear fiber embodiment). A small negative dispersion is advantageous because utilizing a small negative magnitude for dispersion results in an SPM-broadened pulse spectra having a more distinctively level peak during the duration of the pulse. On the other hand, a zero or anomalous dispersion is unfavorable. If the NLM in the above embodiments had a dispersion at or close to zero, due to the production tolerance, part of the fiber dispersion would likely be positive (anomalous), and therefore, modulation instability may occur. Additionally, if the dispersion is anomalous (i.e., the dispersion is larger than 0 in terms of ps/nm/km), modulation instability results, which ruins transmitted pulses. Although a zero or anomalous dispersion is objectionable, it will be appreciated by those of ordinary skill in the art that a high dispersion is likewise undesirable despite the fact that a very broad signal is generated through the spectral broadening, which makes the pulse susceptible to dispersion because a high dispersion value will prevent the signal from being regenerated. Therefore, it will be appreciated by those of skill in the art that the dispersion in the NLM is critical to the correct operation of an optical regenerator.

FIG. 3 shows in block-diagram form an all-optical signal regenerator 70, according to one embodiment of the present invention. As noted above, the dispersion value of an NLM in an optical regenerator can negatively impact the spectral broadening induced by the SPM of the NLM by reducing the spectral broadening to an insufficient level such that pulses may be lost when the spectrally broadened signal passes through an ORBPF. Therefore, it will be appreciated by those of skill in the art that it would be advantageous to achieve the same spectral broadening irrespective of the dispersion resulting from an NLM. Unfortunately, it is difficult or impossible to directly control the dispersion of an NLM through manufacture of the NLM to ensure a constant dispersion. For instance, if a fiber having −0.5 ps/nm/km±1% dispersion were used as the NLM, to obtain the same spectral broadening for a series of signal pulses, the drawing of the non-linear fiber would have to be controlled more precisely than that which is currently achievable due to manufacturing limitations.

The optical signal regenerator and method of the present invention allow for variations in the dispersion of the fiber while ensuring that the same or a very similar spectral broadening results. The present invention operates using the premise that one way to counteract different dispersion values that may be realized, even, e.g., with a target dispersion of −0.5 ps/nm/km, is by adjusting the input power to the NLM. More specifically, the present invention monitors the spectral component of a signal at the output of an optical regenerator's non-linear material, and uses the power constant in the spectral component to determine if the correct power level is being used to launch the signal into the NLM. The present invention then employs a feedback loop to adjust the power level of the signal launched into the NLM to guarantee that a sufficient SPM-broadened spectrum results.

Referring again to FIG. 3, there is illustrated an optical signal regenerator 70 which includes a signal inlet port 71 that is coupled to receive an optical data stream from a transmission medium. The regenerator signal inlet port 71 is coupled to the inlet of a variable optical amplifier 72 and the outlet of the variable optical amplifier 72 is coupled to of the inlet of an NLM 73. The regenerator signal inlet port 71 receives an optical data stream, at an input signal carrier frequency ($\omega_0$), from the transmission medium. The variable optical amplifier 72, as described in detail below, amplifies the input signal data stream so that input signal pulse intensity is sufficient to create adequate SPM induced spectrum broadening when transported within a nonlinear material. The NLM 73, over which the data stream is transmitted, produces an SPM-broadened spectrum, centered around $\omega_0$, which is then subjected to the ORBPF 64 with center frequency $\omega_f$. The outlet of the NLM 73 is coupled to the inlet of an ORBPF 74 with a center frequency of $\omega_f$, and to the inlet of a control filter 76 with a center frequency of $\omega_0$ (equal to $\omega_f$−$\Delta\omega_{shift}$), which is the carrier frequency of the input signal at the signal inlet port 71. The output of the ORBPF 74 is coupled to a regenerator signal outlet port 75. The regenerated signal is created from the OFBPF 74 in the same manner in which regenerated signals are produced by the output of the filters in FIGS. 1 and 2.

Unlike the regenerators in FIGS. 1 and 2, the present invention utilizes the control filter 76 to control the variable optical amplifier 72 via a feedback loop. The variable optical amplifier 72 uses the feedback provided from the control filter 76 to increase or decrease the power of the signal launched into the NLM 73 to ensure a sufficient SPM-broadened spectrum. The control filter 76 is preferably a relatively narrow bandpass filter, though it will be appreciated by those of skill in the art that different types and configurations of filters may be used in the present invention. The control filter 76 examines the input carrier at the output of the NLM 73 to determine its power. According to another aspect of the invention, the control filter 76 examines the central line component of the spectrally broadened signal.

Because the control filter 76 is used to determine the power of the input carrier, it should be appreciated that the $\Delta_{shift}$, or location of the regenerator filter offset, should be selected carefully. However, choosing an offset during production of a filter is relatively simple, and Fiber Bragg Grating (FBG) or other technologies, like thin film and Arrayed Waveguide Gratings (AWGs), as are well known in the art, can be constructed to have a particular center frequency. The selection of the filter off-set is made during installation, and the filter 76 can typically be tuned. This capability allows the control filter 76 to be constructed to identify the central line component.

The output of the control filter 76 is coupled to a power meter 77, which may be a photodetector or similar device known to those of ordinary skill in the art for measuring the average power of the signal at the input carrier frequency received from the control filter 76. The power is averaged before the variable optical amplifier 72 is adjusted. According to one aspect of the invention, the power is averaged every millisecond by averaging or integrating the measured power. It will be appreciated by those of ordinary skill in the art that the power may be averaged more or less often, such as every second. Because the power level of the signal at the input carrier frequency should be very low, once the average power level of a signal is determined, it is applied versus a threshold to ensure the regulation loop maintains a minimum acceptable response. The threshold value may be set at any acceptable level to maintain the appropriate level of the optical amplifier. If the average power level exceeds the threshold, as determined by the comparator 78, the comparator 78 changes the power level of the variable optical amplifier 72 using a generated error signal to effectively reduce the input signal power so that constant spectral broadening can be maintained. It will be appreciated that although the comparator 78 in the embodiment illustrated in FIG. 3 applies the average power determined by the power meter 77 with a threshold value, and then appropriately adjusts, the amplification of the optical amplifier 72 to ensure a low power level at the input carrier frequency, one or more additional hardware and/or software components known to those of skill in the art may be utilized to effect these functions. Therefore, using the feedback loop of the present invention, the variable optical amplifier's 72 power may be constantly varied up and down through the steps of measuring the change in the line component, and providing an error signal to variable optical amplifier 72.

The regenerator of FIG. 3 enables almost the same spectral broadening to be obtained for different fiber dispersion values by adjusting the input signal power to minimize the power observed at the output of the control filter 76. Therefore, fluctuations in fiber dispersion values resulting from the physical features of the NLM will not impact the spectral broadening. Utilizing the feedback loop of the present invention the power of the signal's central line component is minimized. Although this, by itself, does not ensure accurate performance of the variable optical amplifier 72, it enables the amplifier's 72 accurate performance will when combined with a proper choice of filter off-set and bandwidth, as will be appreciated by those of ordinary skill in the art. Because production tolerances for filter bandwidth are excellent, and filters typically can be tuned with respect to center frequency (this applies for fiber Bragg gratings and arrayed waveguide grating filters), the spectral broadening induced by the NLM may be fixed so that the filter off-set and bandwidth are the only free parameters in the system of the present invention.

FIG. 4 shows in block-diagram form a method implemented by the all-optical signal regenerator of FIG. 3, according to one embodiment of the present invention. As illustrated in block 86 of FIG. 4, a data stream having an input carrier frequency is received by a variable amplifier and amplified. The amplified data is then transmitted through a NLM having an NLM inlet operable to accept the amplified data stream (block 88). The NLM induces a signal spectral bandwidth broadening in the amplified data stream using SPM. The amplified, spectrally broadened data stream is then filtered through a bandpass filter having a center frequency and a bandwidth, where the bandpass filter passes frequencies other than the input carrier frequency (block 90). The amplified, spectrally broadened data stream is also filtered through a control filter coupled to the NLM (block 92). According to one aspect of the invention, the control filter has a bandwidth that passes frequencies including the input carrier frequency. Finally, the amplification of the variable amplifier is adjusted based on the output of the control filter (block 94).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical signal regenerator, comprising:
   a variable optical amplifier, wherein said variable optical amplifier is operable to accept an optical data stream, having an input carrier frequency, from a transmission medium and further operable to amplify said optical data stream;
   a nonlinear medium (NLM) having an NLM inlet operable to accept said amplified optical data stream, said NLM utilizing the effect of self-phase modulation (SPM) to induce a signal spectral bandwidth broadening in said amplified optical data stream;
   a bandpass filter (BPF) coupled to said NLM and having a center frequency and a bandwidth, wherein said bandwidth passes frequencies other than said input carrier frequency; and
   a control filter coupled to said NLM, wherein said control filter has a bandwidth that passes frequencies including said input carrier frequency,
   wherein said control filter comprises an outlet coupled to said variable optical amplifier to adjust the amplification of said variable optical amplifier.

2. The optical signal regenerator of claim 1, wherein said NLM comprises optical fiber.

3. The optical signal regenerator of claim 1, wherein said control filter is operable to adjust the amplification of said variable optical amplifier such that the power of said amplified optical data stream at said input carrier frequency is minimized at the control filter output within the bandwidth of this filter.

4. The optical signal regenerator of claim 1, wherein said variable optical amplifier is operable to amplify said optical data stream to a level sufficiently high enough to encompass frequencies included within the transmission band of the BPF.

5. The optical signal regenerator of claim 1, wherein said BPF comprises an outlet providing a regenerated version of said optical data stream.

6. The optical signal regenerator of claim 1, wherein said control filter comprises a bandpass filter having a center frequency within 10 gigahertz of said input carrier frequency.

7. The optical signal regenerator of claim 1, wherein said control filter is operable to examine the central line component of the amplified, spectrally broadened signal received from said NLM.

8. The optical signal regenerator of claim 1, further comprising a power meter, coupled to said control filter and to said variable optical amplifier, wherein said power meter determines the average power of the amplified optical signal passed by said control filter.

9. The optical signal regenerator of claim 8, wherein said power meter determines an average power of a central line component of the amplified, spectrally broadened signal received from said NLM.

10. The optical signal regenerator of claim 8, further comprising a comparator, coupled to said power meter and to said variable optical amplifier, wherein said comparator compares said average power to a threshold to determine whether the amplification power of said variable optical amplifier should be adjusted.

11. A method for optical signal regeneration, comprising:
amplifying a data stream through a variable amplifier, wherein said data stream comprises an input carrier frequency;
transmitting said amplified data stream through a nonlinear medium (NLM) having an NLM inlet operable to accept said amplified data stream, wherein said NLM induces a signal spectral bandwidth broadening in said amplified data stream using self-phase modulation (SPM);
filtering said amplified, spectrally broadened data stream through a bandpass filter (BPF) having a center frequency and a bandwidth, wherein said bandwidth passes frequencies other than said input carrier frequency; and
filtering said amplified, spectrally broadened data stream through a control filter coupled to said NLM, wherein said control filter has a bandwidth that passes frequencies including said input carrier frequency, and
adjusting the amplification of said variable amplifier based on an output of said control filter.

12. The method of claim 11, wherein transmitting said amplified data stream through a nonlinear medium comprises transmitting said amplified data stream through an optical fiber.

13. The method of claim 11, wherein adjusting the amplification of said variable amplifier further comprises adjusting the amplification of said variable amplifier such that the power of the amplified, spectrally broadened data stream at said input carrier frequency is minimized.

14. The method of claim 11, wherein adjusting the amplification of said variable amplifier based on an output of said control filter comprises adjusting said variable amplifier such that said data stream is amplified to a level sufficiently high enough to encompass frequencies included within the transmission band of the BPF.

15. The method of claim 11, further comprising providing a regenerated version of said data stream from an outlet of said BPF.

16. The method of claim 11, wherein filtering said amplified, spectrally broadened data stream through a control filter comprises filtering said amplified, spectrally broadened data stream through a control filter comprising a bandpass filter having a center frequency within 10 gigahertz of said input carrier frequency.

17. The method of claim 11, further comprising examining the central line component of the amplified, spectrally broadened data stream received from said NLM.

18. The method of claim 11, further comprising determining, at a power meter couple to said control filter, the average power of the amplified, spectrally broadened data stream passed by said control filter.

19. The method of claim 18, further comprising determining an average power of a central line component of the spectrally broadened data stream received from said NLM.

20. The method of claim 18, further comprising comparing said average power to a threshold to determine whether the amplification power of said variable amplifier should be adjusted.

* * * * *